(No Model.)
E. S. McCLELLAN.
AIR INLET FOR SEWERS AND DRAINS.
No. 381,711. Patented Apr. 24, 1888.
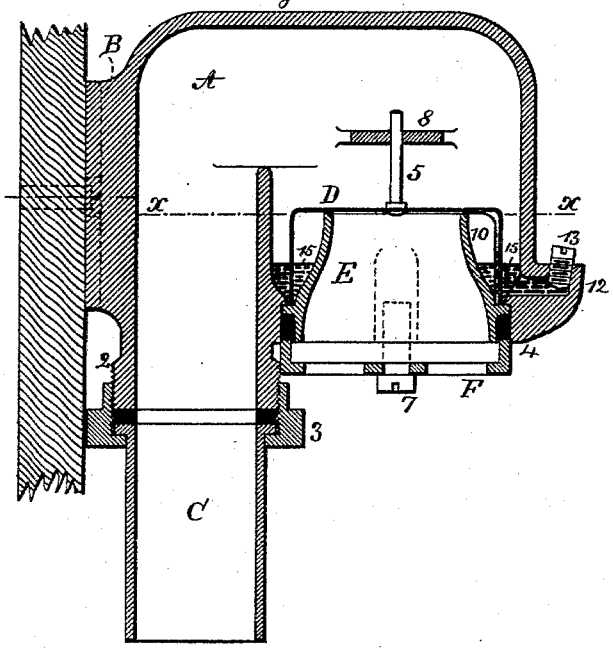
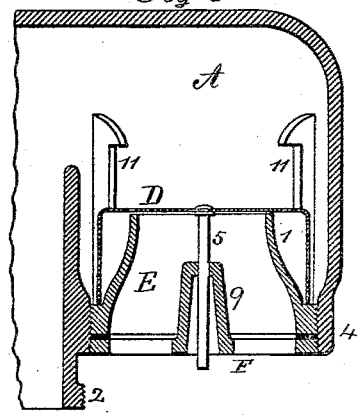
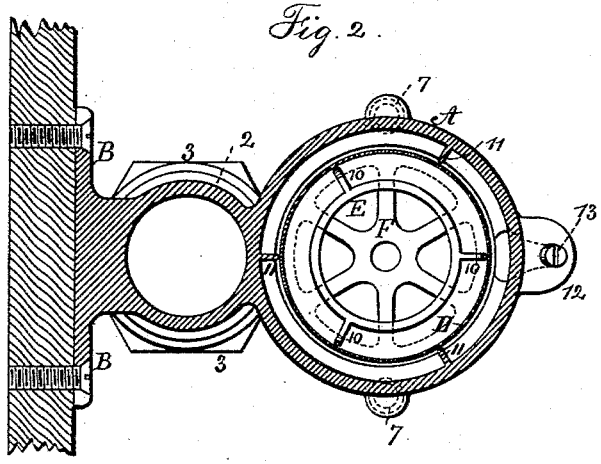
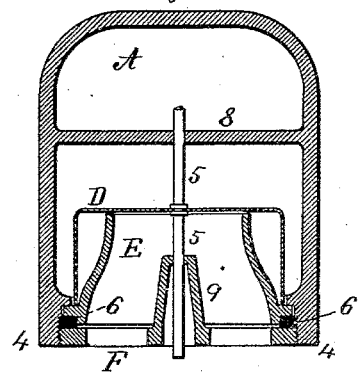
Witnesses:
J. Stait
Chas. H. Smith
Inventor:
Ezra Spencer McClellan
per Lemuel W. Serrell atty

UNITED STATES PATENT OFFICE.

EZRA S. McCLELLAN, OF PATERSON, NEW JERSEY.

AIR-INLET FOR SEWERS AND DRAINS.

SPECIFICATION forming part of Letters Patent No. 381,711, dated April 24, 1888.

Application filed July 5, 1887. Serial No. 243,352. (No model.)

*To all whom it may concern:*

Be it known that I, EZRA SPENCER McCLELLAN, of Paterson, in the county of Passaic and State of New Jersey, have invented an Improvement in Air-Inlets for Sewers, Traps, and Drains, of which the following is a specification.

The object of this invention is to prevent the siphonage of traps connected with plumbing fixtures and to secure sufficient ventilation of the branch pipes to avoid the accumulation of deleterious gases in a more economical and reliable way than by the methods usually employed.

It is a well-known fact that the discharge of water from plumbing fixtures through waste and soil pipes produces a minus or vacuum pressure, and this tends to siphon the trap of the fixture discharged, as well as all other traps of the system in the vicinity of the flush. My improvement admits air automatically into the waste or soil pipe at or near the crown of the trap on the sewer side of the seal whenever a slight minus pressure is developed in the pipes. This preserves an equilibrium between the pressure inside and outside of the pipes and prevents the possibility of siphoning any trap to which it is properly attached. It also serves to ventilate each branch to which it may be attached by the free admission of air whenever any of the pipes in the vicinity are flushed.

The present invention is a modification of and improvement upon that for which Letters Patent No. 339,800 were granted to me, the object of the present improvement being to facilitate the construction of the air-vent and render it more perfect in its operation.

In the drawings, Figure 1 is a vertical section of my improved air-vent. Fig. 2 is a sectional plan at the line *x x*. Figs. 3 and 4 are sections of modifications in the details of construction.

The hollow case A is of a suitable size according to the size of the waste-pipe to which it is to be connected by the pipe C. I prefer to make a nipple, 2, upon the case A, usually at one side or upon the lower part of the case, to receive the screw-ring 3 of the union-joint, so that the case can easily be connected to or disconnected from the pipe C; and I remark that I usually place the air-inlet above the trap in the sewer or waste pipe and run the pipe C down from the case A to the upper part of the trap, so that the air may draw into the sewer or drain in such a manner as to prevent the siphon action.

The case A is supported in any suitable manner. I have shown slotted flanges B for receiving screws that pass into the wall or partition.

The case A has a downwardly-projecting rim, 4, that is of a size sufficient for the passage through it of the air-valve D, which valve is provided with a guide stem, 5, and within the rim 4 is introduced the movable thimble E, the sides of which are inclined inwardly, so that a trough is formed between the outer surface of the thimble and the inner surface of the rim 4 for the reception of the mercury, 15, and this mercury forms a seal around the lower edges of the cup-shaped air-valve D, and this air-valve is preferably of thin sheet-steel, the sides of which are cylindrical, and it is sufficiently light to lift readily by atmospheric pressure when any minus pressure exists within the case A, and the air passes beneath the edges of this inverted-cup shaped valve to render the pressure within the waste-pipe equal to the external atmospheric pressure, and thereby stop any siphoning action.

The movable thimble E may have a screw upon its edges, so as to be screwed into the inside of the rim 4, as seen in Fig. 3, or it may be made with a flange and channel for the reception of a rubber packing ring, 6, which is held in place by a follower, F, screwed into the inside of the rim 4, as seen in Fig. 4, or pressed into place by separate screws 7, as seen in Fig. 1. In either instance the center portion of the follower F is open-work, that freely admits the passage of air, but protects the air-valve from injury.

The stem 5 may pass upward, as in Fig. 1, and be guided by the bridge 8, or it may pass downwardly, as in Fig. 3, and be guided by a bearing or bridge, 9, at the center of the follower F, as seen in Fig. 3, or it may pass both up and down through the guides 8 and 9, as seen in Fig. 4.

It is generally preferable to provide wings 10 upon the outer surface of the thimble E and within the air-valve D, to aid in keeping the air-valve in its proper position, or there may be vertical wings 11 projecting from the inner surface of the hollow case A and at equal distances around the air-valve to aid in guiding or steadying the same, as seen in Fig. 3, or both the wings 10 and 11 may be made use of.

The joint between the thimble E and the rim 4 is to be made tight, because the same is at the bottom of the mercury-trough, and at one side of the rim 4 and outside the case I provide a mercury-cup, 12, having a hole extending from the bottom thereof through the case A into the trough for the mercury, 15, and the top of this cup is to be at the proper height to correspond with the mercury-level, so that the apparatus can be transported and put up into place without any mercury in the trough, and thereafter the mercury can be supplied into the cup 12 and it runs into the trough to the proper height.

A screw-plug, 13, is by preference introduced into the hole that leads from the cup into the mercury-trough, so that the mercury will be properly confined within the trough and be of the proper depth for the lower edge of the air-valve to dip into it.

I prefer to use mercury in the cup, but do not limit myself to the same.

The parts of this apparatus may be rendered rust-proof by the Bower-Barff process.

I claim as my invention—

1. The combination, with the inverted-cup-shaped air-valve, of the hollow case A, having a connection for the pipe leading to the sewer side of the trap or drain, and a rim with an opening through which the air-valve is inserted, a hollow thimble beneath and within the cup-shaped air-valve and connected to the rim, and a liquid in the annular cup between the rim and the thimble, substantially as set forth.

2. The combination, with the inverted-cup-shaped air-valve, of the hollow case having an opening in the bottom thereof for the admission of the air-valve, a movable open hollow thimble within and below the inverted-cup-shaped air-valve, a stem upon the air-valve and a guide or guides for the same, and mercury in the annular trough around the thimble, substantially as set forth.

3. The combination, with the inverted-cup-shaped air-valve, of a case having an opening through which the air-valve is introduced, a pipe leading from the case to the sewer or drain, an open hollow thimble within the air-valve, and a ring for securing the thimble firmly within the rim of the case, and mercury in the annular trough around the thimble, substantially as set forth.

4. The combination, with the inverted-cup-shaped air-valve, of a case having a rim and opening through which the air-valve is introduced, a movable open hollow thimble within and below the air-valve and having a ring around its lower end passing into the rim of the case, and a follower having air-inlet openings through it and secured to the rim of the case, substantially as set forth.

5. The combination, with the inverted-cup-shaped air-valve, of a case with an opening on the under side through which the air-valve is introduced, a separate open thimble within the air-valve, a ring-follower for securing the thimble to the case, and mercury in the annular trough around the thimble and into which the lower edges of the air-valve pass, and guide-wings to aid in retaining the air-valve in position as it rises or falls, substantially as specified.

6. The combination, with the inverted-cup-shaped air-valve, of a case having an annular mercury-trough into which the edges of the air-valve dip, an open thimble forming an air-inlet opening through the case and below the valve, and a supply-cup outside the case with a hole through which the mercury is introduced into the trough, and a plug for the supply-cup, substantially as set forth.

Signed by me this 28th day of June, A. D. 1887.

E. S. McCLELLAN.

Witnesses:
GEO. T. PINCKNEY,
W. L. SERRELL.